United States Patent [19]
Matsumoto

[11] Patent Number: 5,701,204
[45] Date of Patent: Dec. 23, 1997

[54] ZOOM LENS SYSTEM

[75] Inventor: Hiroyuki Matsumoto, Wakayama, Japan

[73] Assignee: Minolta Co., Ltd., Suita, Japan

[21] Appl. No.: 493,902

[22] Filed: Jun. 23, 1995

[30] Foreign Application Priority Data

Jun. 29, 1994 [JP] Japan ................... 6-147343

[51] Int. Cl.$^6$ ................... G02B 15/14
[52] U.S. Cl. ................... 359/684; 359/687
[58] Field of Search ................... 359/689, 684, 359/686, 687

[56] References Cited

U.S. PATENT DOCUMENTS

| | | | |
|---|---|---|---|
| 4,576,448 | 3/1986 | Ikari | 350/465 |
| 4,787,719 | 11/1988 | Imai | 350/427 |
| 5,191,475 | 3/1993 | Terasawa et al. | 359/684 |

FOREIGN PATENT DOCUMENTS

| | | |
|---|---|---|
| 58-211117 | 12/1983 | Japan. |
| 58-211118 | 12/1983 | Japan. |

*Primary Examiner*—Scott J. Sugarman
*Attorney, Agent, or Firm*—Price, Gess & Ubell

[57] ABSTRACT

A zoom lens system includes from the object side a first lens unit of positive refractive power and a second lens unit of negative refractive power. The zoom lens system further includes a rearmost lens unit on the most image side. During zooming from the shortest focal length condition to the longest focal length condition, the first lens unit is moved toward the object side so that the distance between the first and second lens units increases. During focusing to a shorter object distance condition, the first lens Unit .is moved toward the object side while the rearmost lens unit is moved toward the image side, and a ratio between movement amounts of the first and rearmost lens units varies according to zooming.

13 Claims, 16 Drawing Sheets

FNO=4.60

SPHERICAL SINE
ABERRATION CONDITION

Y'=21.63

ASTIGMATISM

Y'=21.63

DISTORTION %

FNO=5.80

SPHERICAL SINE
ABERRATION CONDITION

Y'=21.63

ASTIGMATISM

Y'=21.63

DISTORTION %

FNO=6.90

SPHERICAL SINE
ABERRATION CONDITION

Y'=21.63

ASTIGMATISM

Y'=21.63

DISTORTION %

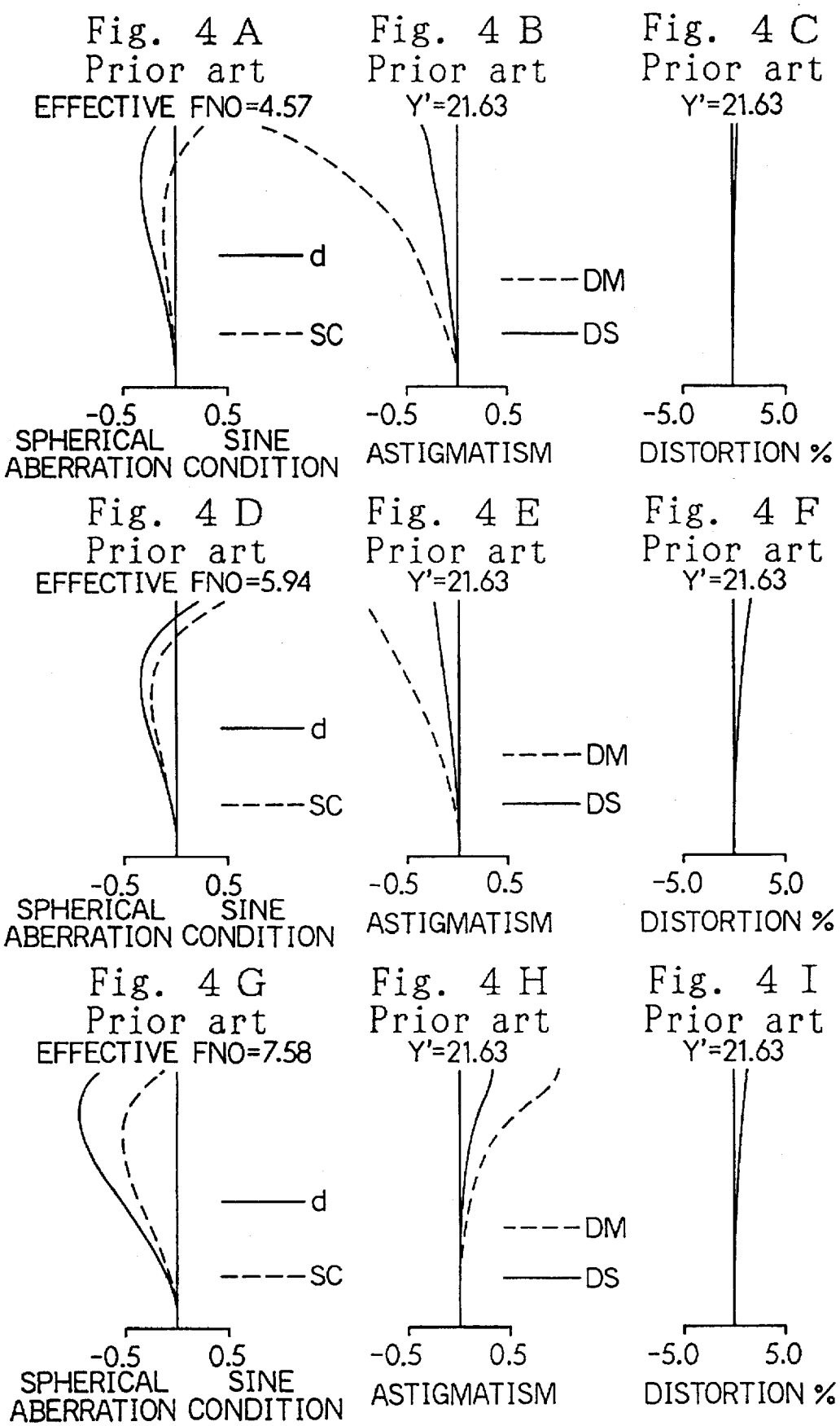

EFFECTIVE FNO=4.56
— d
---- SC
-0.5   0.5
SPHERICAL SINE
ABERRATION CONDITION

Y'=21.63
---- DM
— DS
-0.5   0.5
ASTIGMATISM

Y'=21.63
-5.0   5.0
DISTORTION %

EFFECTIVE FNO=5.96
— d
---- SC
-0.5   0.5
SPHERICAL SINE
ABERRATION CONDITION

Y'=21.63
---- DM
— DS
-0.5   0.5
ASTIGMATISM

Y'=21.63
-5.0   5.0
DISTORTION %

EFFECTIVE FNO=7.77
— d
---- SC
-0.5   0.5
SPHERICAL SINE
ABERRATION CONDITION

Y'=21.63
---- DM
— DS
-0.5   0.5
ASTIGMATISM

Y'=21.63
-5.0   5.0
DISTORTION %

EFFECTIVE FNO=4.53
— d
---- SC
-0.5   0.5
SPHERICAL   SINE
ABERRATION CONDITION

Y'=21.63
---- DM
— DS
-0.5   0.5
ASTIGMATISM

Y'=21.63
-5.0   5.0
DISTORTION %

EFFECTIVE FNO=5.70
— d
---- SC
-0.5   0.5
SPHERICAL   SINE
ABERRATION CONDITION

Y'=21.63
---- DM
— DS
-0.5   0.5
ASTIGMATISM

Y'=21.63
-5.0   5.0
DISTORTION %

EFFECTIVE FNO=6.48
— d
---- SC
-0.5   0.5
SPHERICAL   SINE
ABERRATION CONDITION

Y'=21.63
---- DM
— DS
-0.5   0.5
ASTIGMATISM

Y'=21.63
-5.0   5.0
DISTORTION %

FNO=4.60

— d
---- SC

SPHERICAL SINE
ABERRATION CONDITION

Y'=21.63

---- DM
— DS

ASTIGMATISM

Y'=21.63

DISTORTION %

FNO=5.60

— d
---- SC

SPHERICAL SINE
ABERRATION CONDITION

Y'=21.63

---- DM
— DS

ASTIGMATISM

Y'=21.63

DISTORTION %

FNO=6.70

— d
---- SC

SPHERICAL SINE
ABERRATION CONDITION

Y'=21.63

---- DM
— DS

ASTIGMATISM

Y'=21.63

DISTORTION %

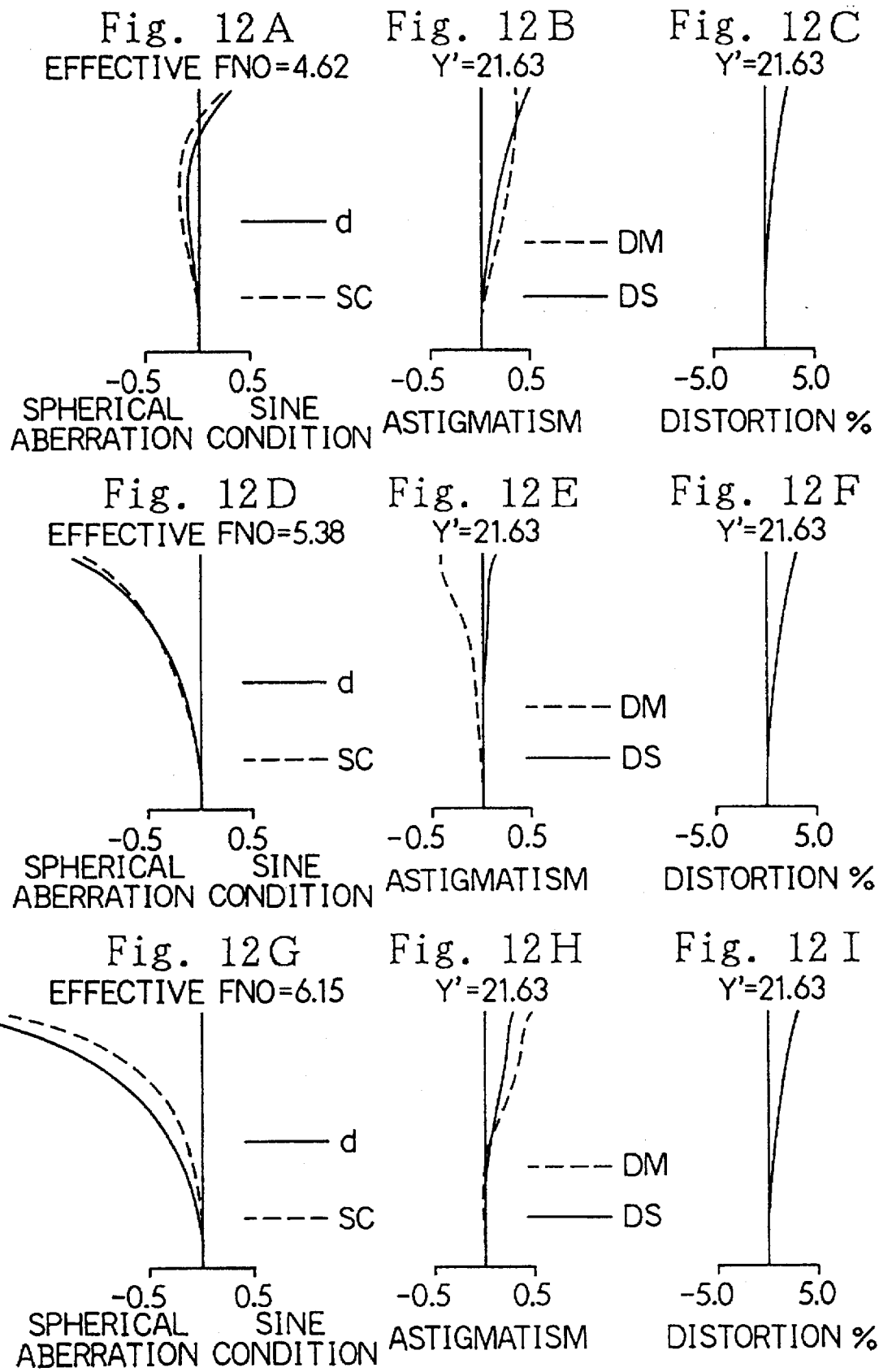

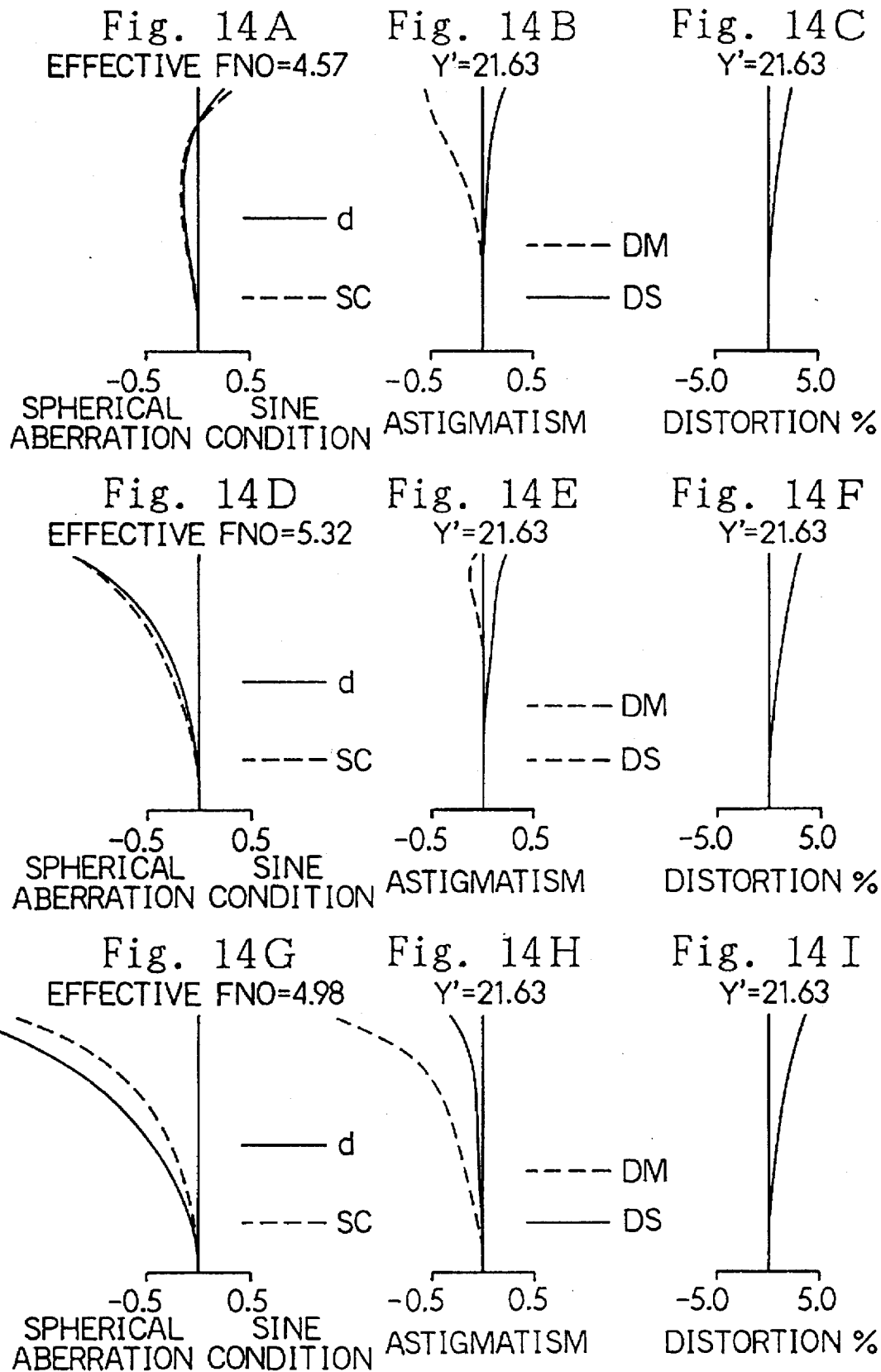

EFFECTIVE FNO=4.63

—— d
---- SC

-0.5   0.5
SPHERICAL   SINE
ABERRATION CONDITION

Y'=21.63

---- DM
—— DS

-0.5   0.5
ASTIGMATISM

Y'=21.63

-5.0   5.0
DISTORTION %

EFFECTIVE FNO=5.34

—— d
---- SC

-0.5   0.5
SPHERICAL   SINE
ABERRATION CONDITION

Y'=21.63

---- DM
—— DS

-0.5   0.5
ASTIGMATISM

Y'=21.63

-5.0   5.0
DISTORTION %

EFFECTIVE FNO=6.26

—— d
---- SC

-0.5   0.5
SPHERICAL   SINE
ABERRATION CONDITION

Y'=21.63

---- DM
—— DS

-0.5   0.5
ASTIGMATISM

Y'=21.63

-5.0   5.0
DISTORTION %

ZOOM LENS SYSTEM

BACKGROUND OF THE INVENTION

1. Field of the Invention

The present invention relates to a zoom lens system, and more specifically, to a zoom lens system characterized by its focusing method.

2. Description of the Prior Art

A focusing method employed by many conventional zoom lens systems, particularly, telephoto zoom lens systems with a zoom ratio of approximately 2.5× or higher and a focal length at the longest focal length condition (hereinafter, referred to as telephoto limit) of approximately 200 m or greater is a front lens moving out method. According to the front lens moving out method, the maximum magnification is approximately ¼ at the telephoto limit. However, according to this method, the variation in aberrations due to focusing is large and the magnification at the shortest focal length condition (hereinafter, referred to as wide angle limit) is less than ¹⁄₁₀.

The above-mentioned problem will be described in more detail with reference to a conventional telephoto zoom lens system of four or five lens unit type. The zoom lens system includes from the object side a first lens unit of positive refractive power and a second lens unit of negative refractive power and comprises the rearmost lens unit of negative refractive power at the image side end.

With respect to a method (hereinafter, referred to as "F method") in which focusing is performed by moving the first lens unit toward the object side and a method (hereinafter, referred to as "L method") in which focusing is performed by moving the most image side lens unit (hereinafter, referred to as "rearmost lens unit") toward the image side in a zoom lens system of this type, Table 1 shows directions of the variation in spherical aberration and field curvature at the wide angle limit and at the telephoto limit due to focusing according to these methods.

From Table 1, it is understood that the aberrations vary with respect to three items and that the directions of variation in aberrations of the F and L methods are opposite to each other. Therefore, by combining these two focusing methods, the variation in aberrations due to focusing can be canceled.

With respect to a conventional zoom lens system which performs focusing according to a focusing method that is a combination of the F and L methods, its lens movement and variation in aberrations during focusing will be described with reference to FIGS. 1 through 4A to 4I.

The zoom lens system described herein as a prior art is, as shown in FIG. 1, a four-unit zoom lens system comprising from the object side a first lens unit Gr1 of positive refractive power, a second lens unit Gr2 of negative refractive power, a third lens unit Gr3 of positive refractive power and a fourth lens unit Gr4 of negative refractive power. As shown in FIGS. 3A to 3C, during zooming from the wide angle limit <W> to the telephoto limit <T>, the first lens unit Gr1, the third lens unit Gr3 and the fourth lens unit GR4 are moved toward the object side so that the distance between the first lens unit Gr1 and the second lens unit Gr2 increases, that the distance between the second lens unit Gr2 and the third lens unit Gr3 decreases and that the distance between the third lens unit Gr3 and the fourth lens unit Gr4 decreases.

FIGS. 2A to 2I show aberration curves of the conventional lens system for a subject at infinity. FIGS. 2A to 2C show aberration curves at the wide angle limit. FIGS. 2D to 2F show aberration curves at the middle focal length condition. FIGS. 2G to 2I show aberration curves at the telephoto limit. In these figures, the solid line d represents an aberration to d-line, the broken line SC represents a sine condition, the broken line DM and the solid line DS represent astigmatism at the meridional and sagittal image planes, respectively.

During focusing, the first lens unit Gr1 is moved toward the object side and the fourth lens unit Gr4 is moved toward the image side by the same amount as shown in Table 2, where $X_1$ is a focusing movement amount of the first lens unit Gr1 and $X_4$ is a focusing movement amount of the fourth lens unit Gr4. With respect to the focusing movement amount, the movement toward the object side is represented by a positive value. The ratios of movement amounts of the lens units moved during focusing are also shown in FIGS. 3A to 3C.

Like FIGS. 2A to 2I, FIGS. 4A to 4I show aberration curves of this case for a subject at the shortest object distance. FIGS. 4A to 4C show aberration curves at the wide angle limit. FIGS. 4D to 4F show aberration curves at the middle focal length condition. FIGS. 4G to 4I show aberration curves at the telephoto limit. When the first lens unit Gr1 and the fourth lens unit Gr4 are moved by the same amount, as is apparent from FIGS. 4A to 4I, the effect of the fourth lens unit Gr4 is too great particularly at the shortest object distance at the wide angle limit <W>, so that the field curvature largely varies toward the under side. At the shortest object distance at the telephoto limit <T>, the effect of the first lens unit Gr1 is too great, so that the field curvature varies toward the over side. This is because the degree of effect of the variation in aberrations differs between the first lens unit Gr1 and the fourth lens unit Gr4 at each zoom position.

Thus, in the above-described conventional lens system, since the variation in aberrations due to focusing is large, it is difficult to reduce the shortest object distance (i.e. to increase the maximum magnification).

SUMMARY OF THE INVENTION

An object of the present invention is to provide a zoom lens system whose maximum magnification is increased by restraining the variation in aberrations due to focusing.

BRIEF DESCRIPTION OF THE DRAWINGS

This and other objects and features of this invention will become clear from the following description, taken in conjunction with the preferred embodiments with reference to the accompanied drawings in which:

FIGS. 4A to 4I show aberration curves of the conventional zoom lens system for a subject at the shortest object distance;

FIGS. 12A to 12I show aberration curves of the third embodiment for a subject at the shortest object distance;

FIGS. 14A to 14I show aberration curves of the fourth embodiment for a subject at the shortest object distance;

DESCRIPTION OF THE PREFERRED EMBODIMENTS

Figure 1:
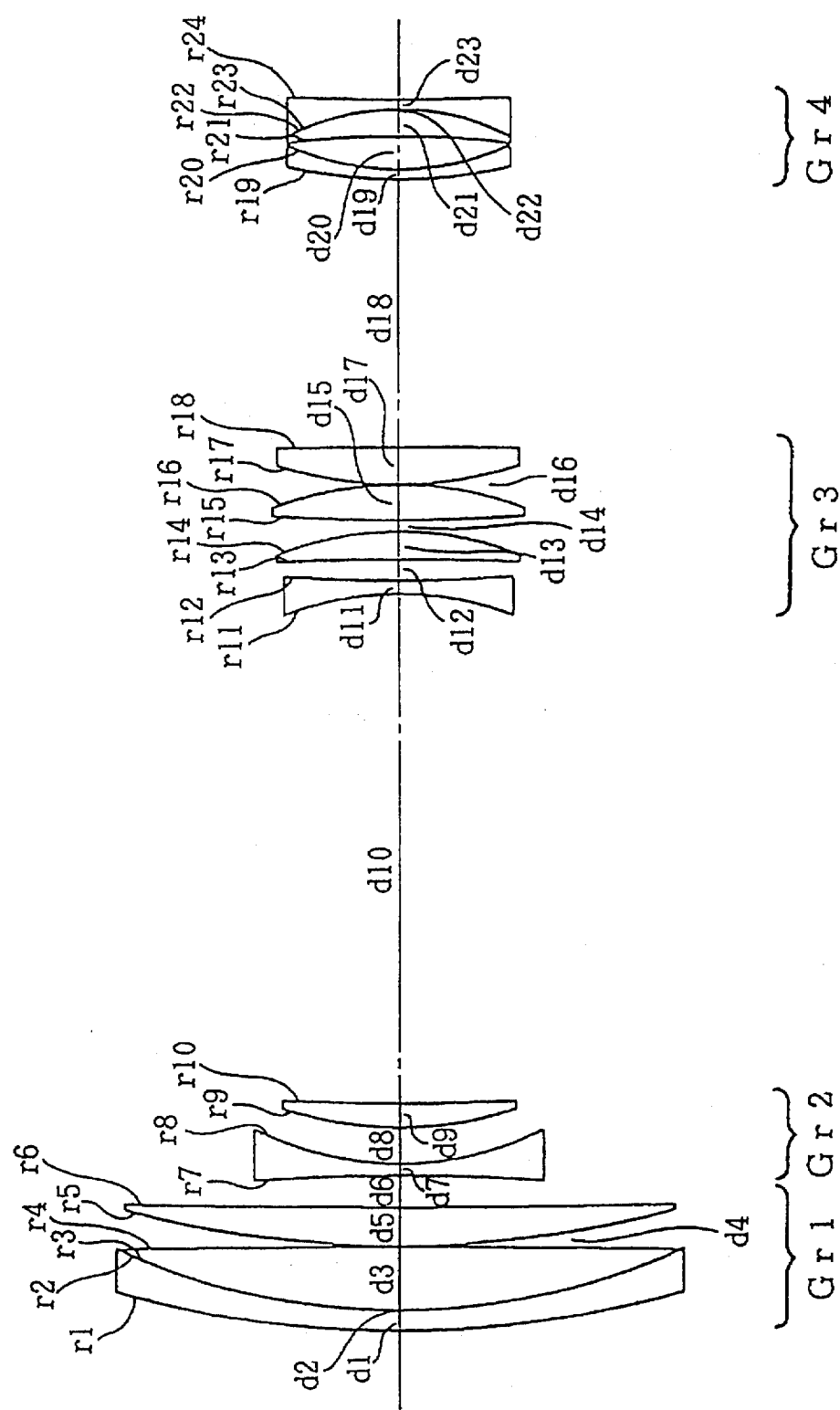
FIG. 1 shows the lens arrangement of first and second embodiments of the present invention and a conventional zoom lens system.
Figure 2:
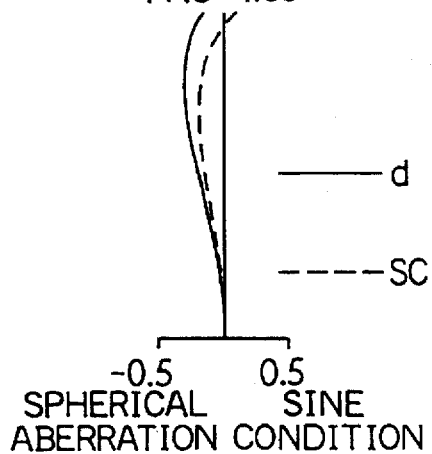
FIGS. 2A to 2I show aberration curves of the first and second embodiments of the present invention and the conventional zoom lens system for a subject at infinity.
Figure 2:
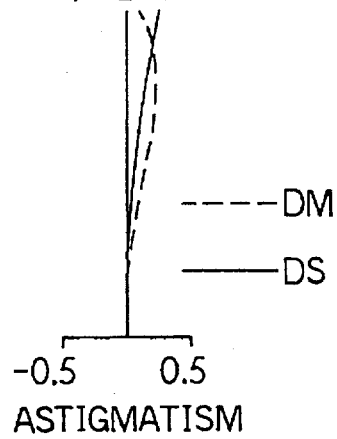
Figure 2:
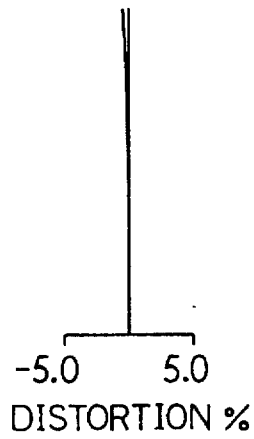
Figure 2:
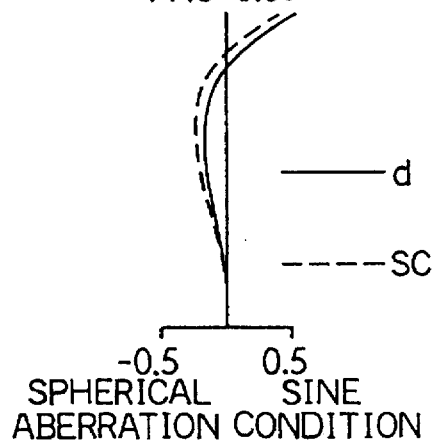
Figure 2:
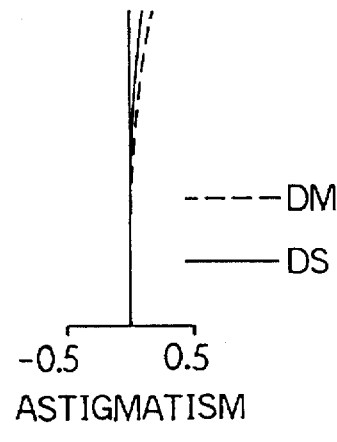
Figure 2:
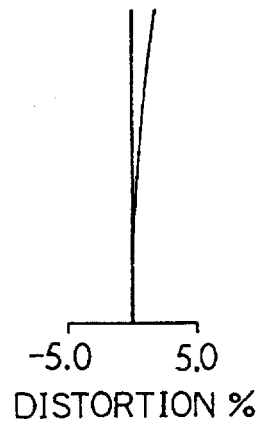
Figure 2:
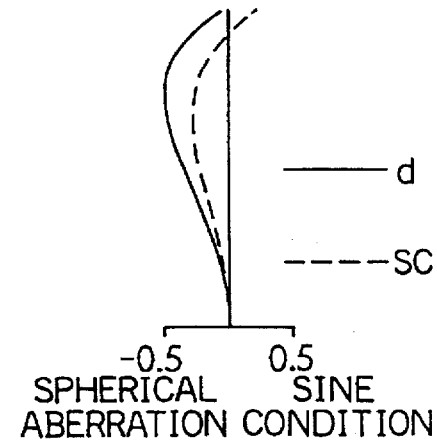
Figure 2:
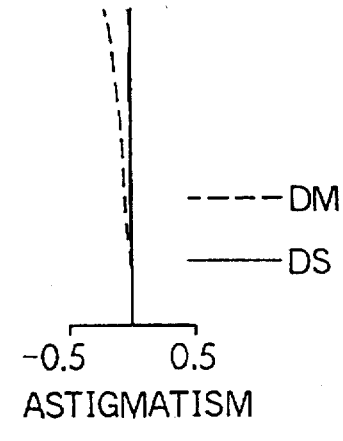
Figure 2:
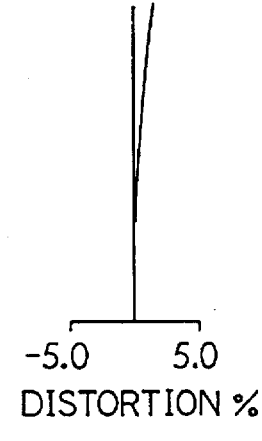
Figure 3A:
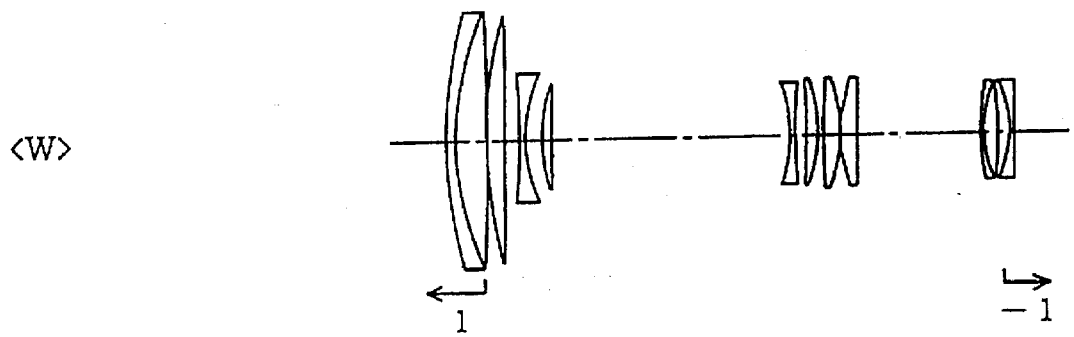
FIGS. 3A to 3C show the movements of the lens units of the conventional zoom lens system.
Figure 3B:
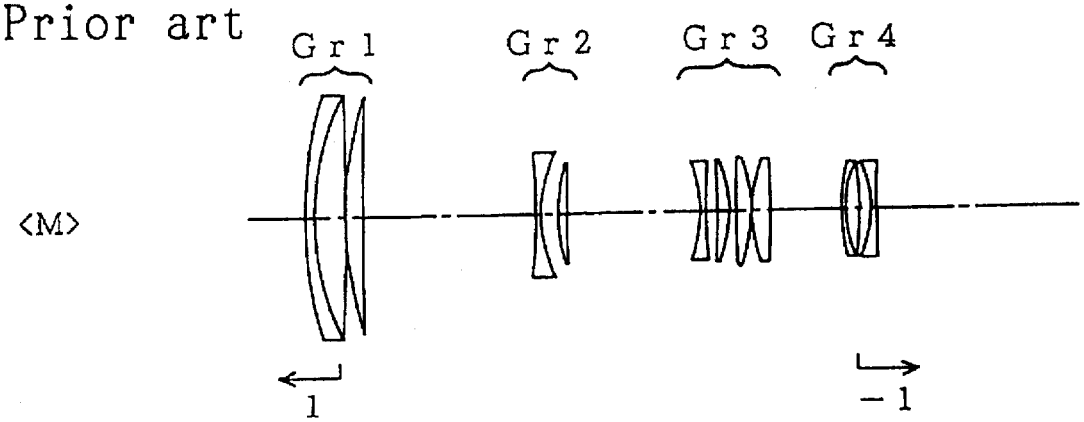
Figure 3C:
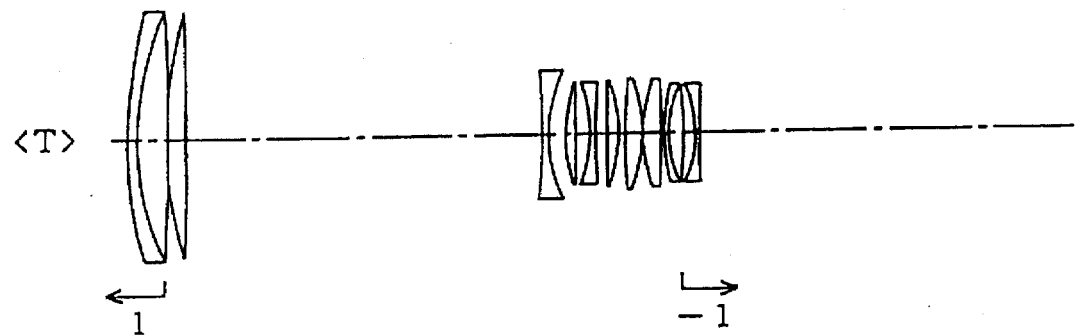
Figure 5A:
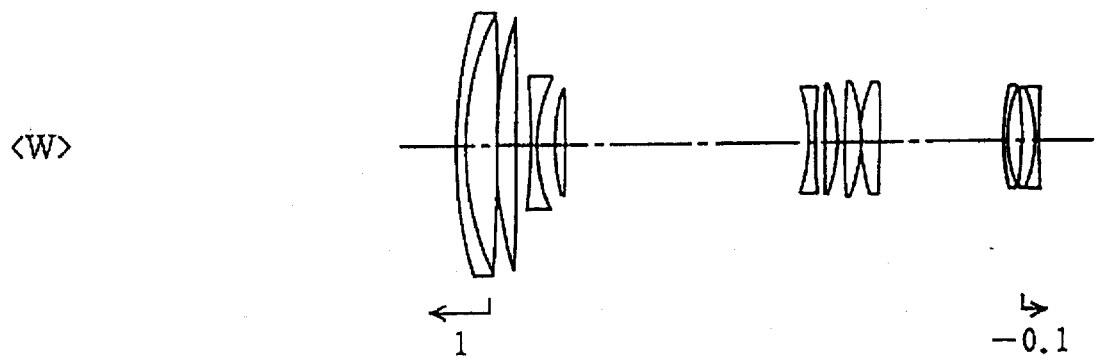
FIGS. 5A to 5C show the movements of the lens units of the first embodiment.
Figure 5B:
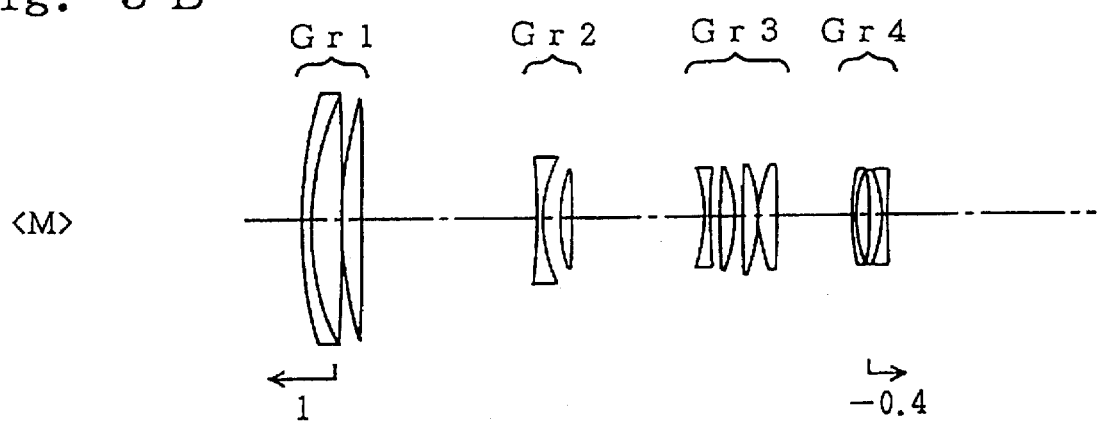
Figure 5C:
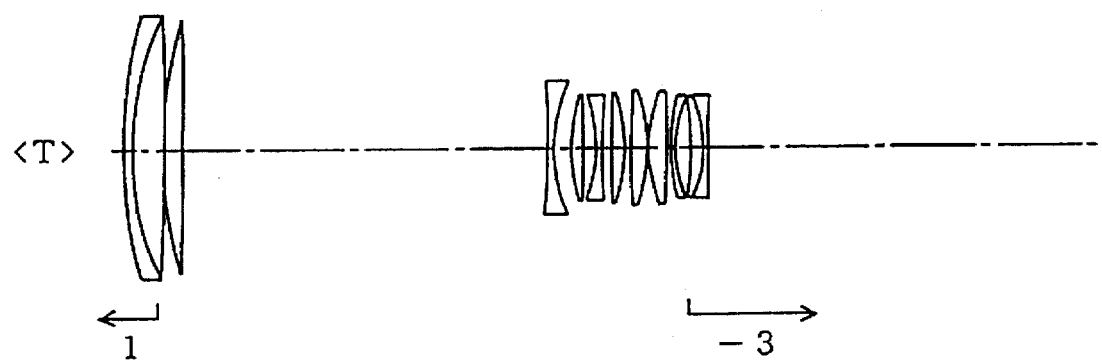
Figure 6A:
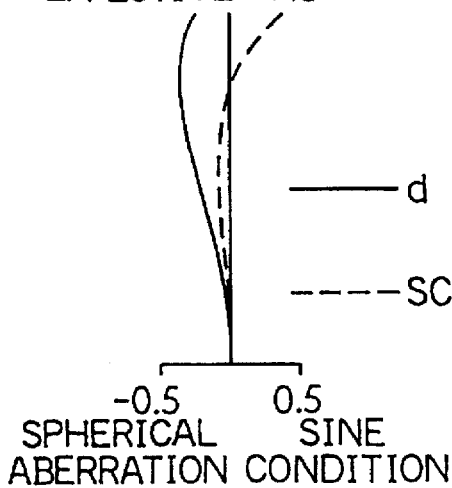
FIGS. 6A to 6I show aberration curves of the first embodiment for a subject at the shortest object distance.
Figure 6B:
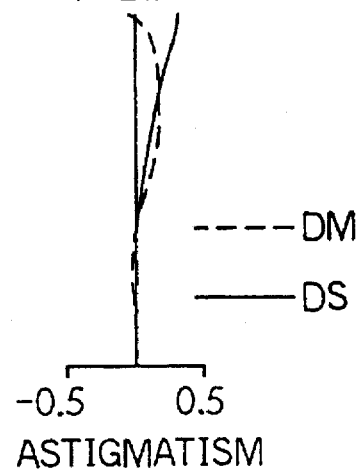
Figure 6C:
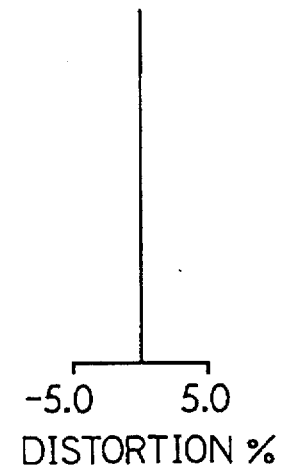
Figure 6D:
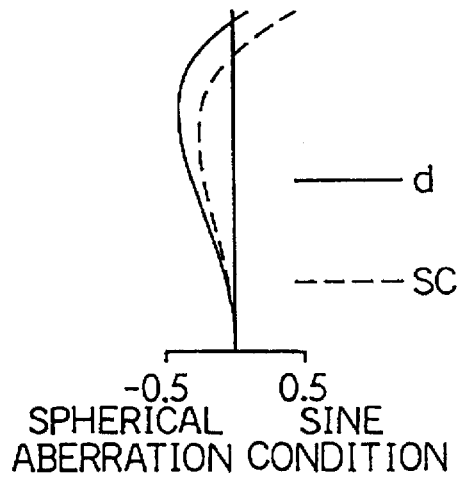
Figure 6E:
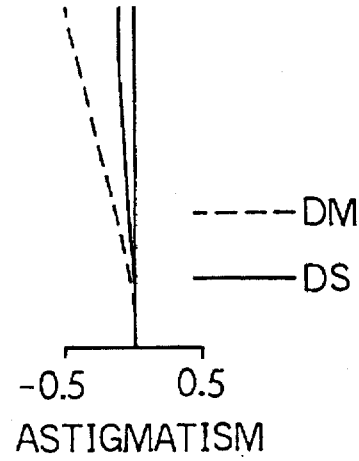
Figure 6F:
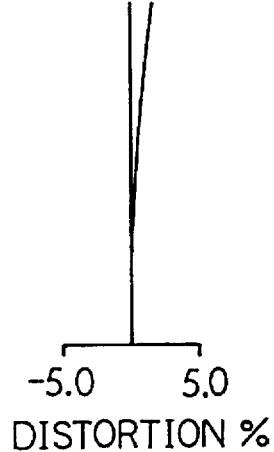
Figure 6G:
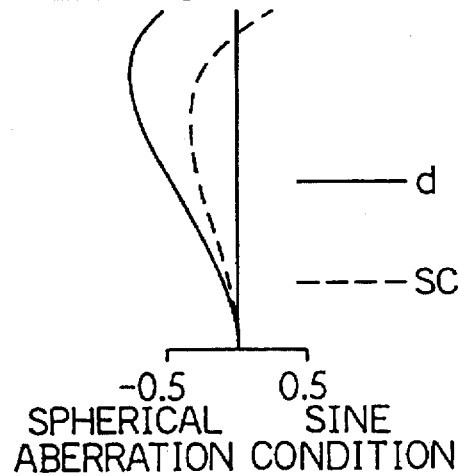
Figure 6H:
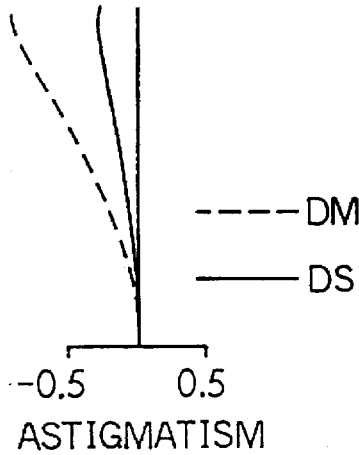
Figure 6I:
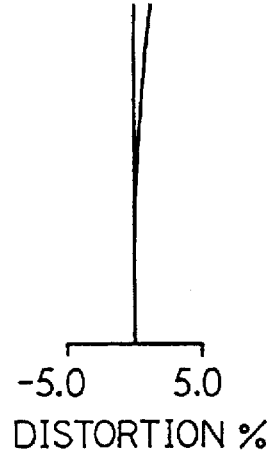
Figure 7A:
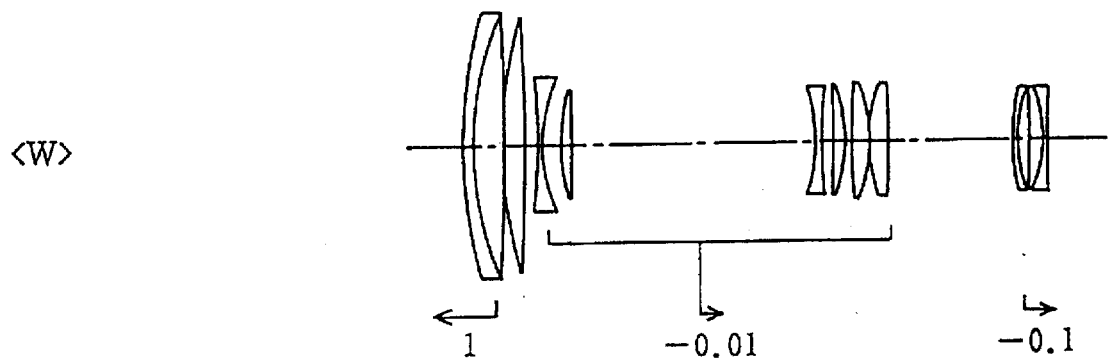
FIGS. 7A to 7C show the movements of the lens units of the second embodiment.
Figure 7B:
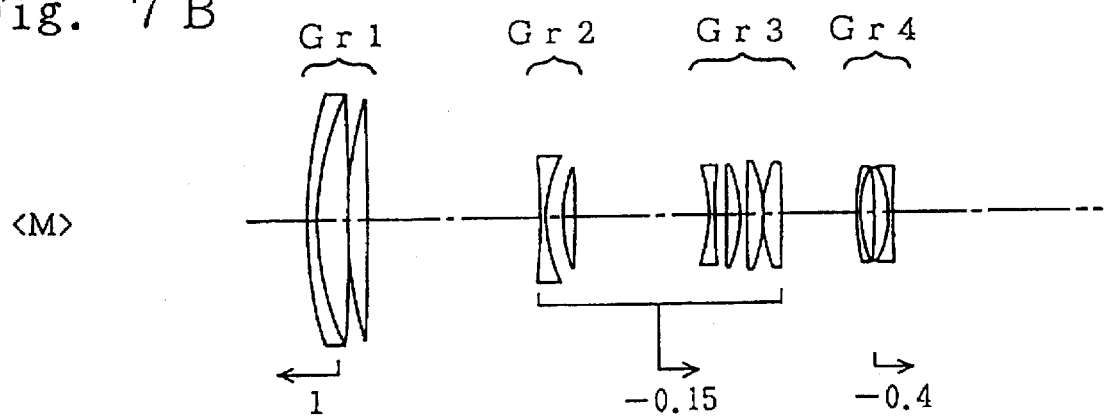
Figure 7C:
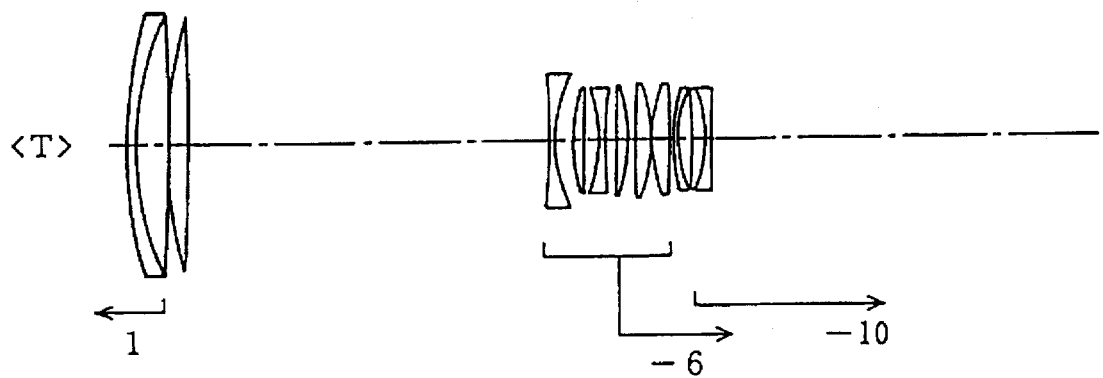
Figure 8A:
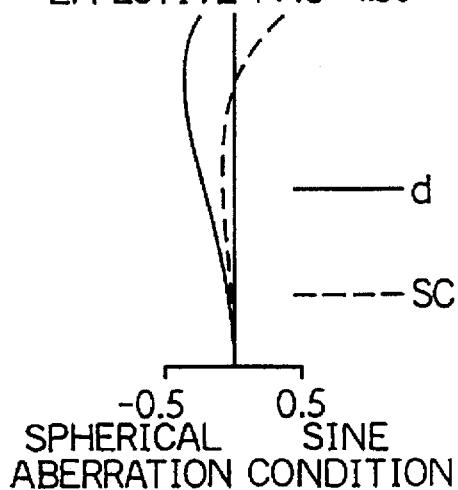
FIGS. 8A to 8I show aberration curves of the second embodiment for a subject at the shortest object distance.
Figure 8B:
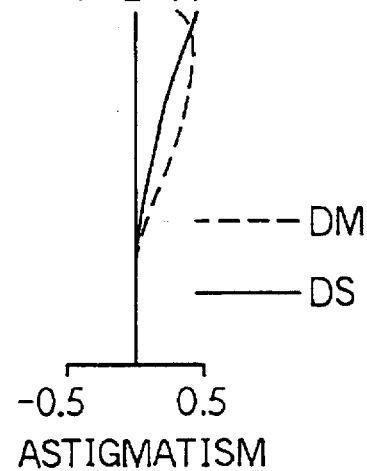
Figure 8C:
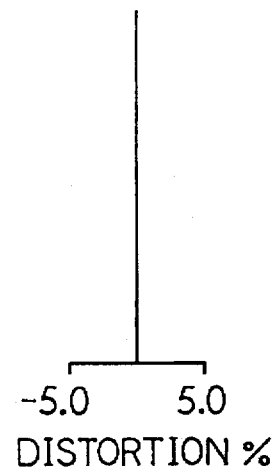
Figure 8D:
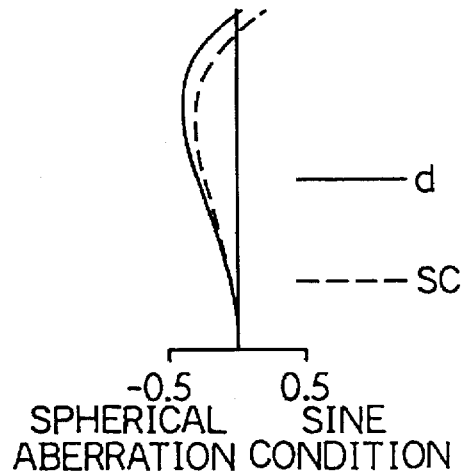
Figure 8E:
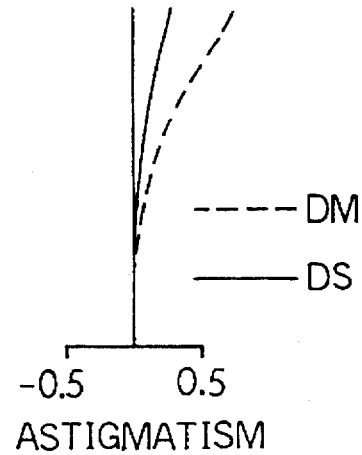
Figure 8F:
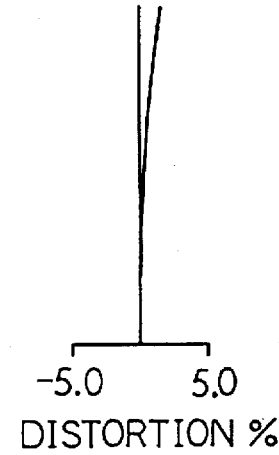
Figure 8G:
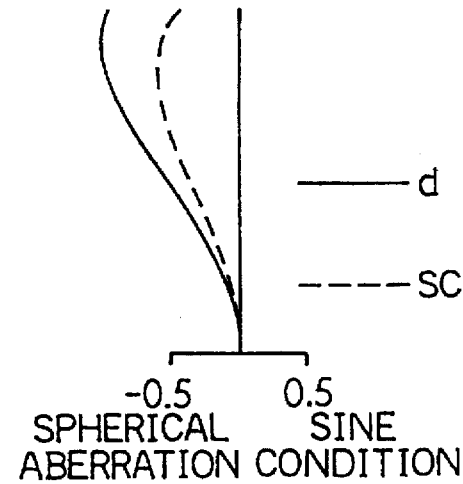
Figure 8H:
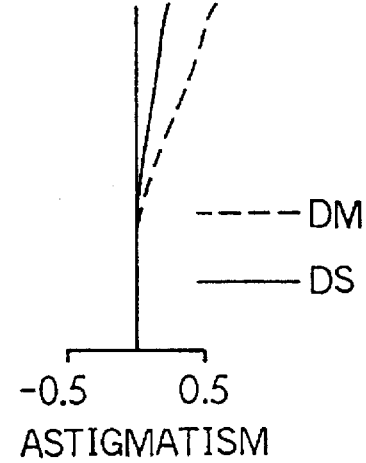
Figure 8I:
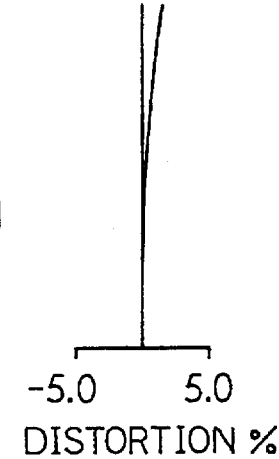

A zoom lens system according to the present invention comprises from the object side a first lens unit of positive refractive power and a second lens unit of negative refractive power and comprises a rearmost lens unit of negative refractive power at the image side end. During zooming from the wide angle limit (that is, a shortest focal length condition) to the telephoto limit (that is, a longest focal length condition), the first lens unit moves toward the object side so that the distance between the first and second lens units increases. During focusing, the first lens unit is moved toward the object side and the rearmost lens unit are moved toward the image side, and the ratio between the focusing movement amounts of the first and rearmost lens units is varied according to zooming.

Thus, the zoom lens system of the present invention employs a focusing method in which a plurality of lens units are relatively moved. During focusing, by moving the first lens unit of positive refractive power and the rearmost lens unit of negative refractive power toward the object side and toward the image side, respectively, and by varying the ratio between the focusing movement amounts of the first and rearmost lens units according to zooming, the variation in aberrations (except spherical aberration at the telephoto limit) due to focusing is restrained in the entire zooming range. As a result, the maximum magnification is increased by approximately ¼ at the wide angle limit and by ½ at the telephoto limit. At this time, the variation in spherical aberration at the telephoto limit remains and spherical aberration largely varies toward the under side at the shortest object distance. However, since the magnification is high, such a variation is permissible to some degree.

With the above-described arrangement, the variation in aberrations due to focusing is restrained and the magnification is increased. Further, as a change in accordance with zooming at the ratio between the focusing movement amounts of the first and rearmost lens units, the following condition (1) is preferably fulfilled during focusing. When the condition (1) is not fulfilled, the variation in field curvature toward the under side is particularly large near the wide angle limit or the variation in field curvature toward the over side is particularly large near the telephoto limit.

$$\frac{|X_{LW}|}{|X_{FW}|} < \frac{|X_{LT}|}{|X_{FT}|} \quad (1)$$

where $X_{FW}$ represents the amount of a focusing movement of the first lens unit up to an object distance near the wide angle limit, $X_{LW}$ represents the amount of a focusing movement of the rearmost lens unit up to an object distance near the wide angle limit, $X_{FT}$ represents the amount of a focusing movement of the first lens unit up to an object distance near the telephoto limit, and $X_{LT}$ represents the amount of a focusing movement of the rearmost lens unit up to an object distance near the telephoto limit.

In addition, the following conditions (a) and (b) are preferably fulfilled. When the condition (a) is not fulfilled, the variation in field curvature toward the under side is particularly large near the wide angle limit. When the upper limit of the condition (b) is exceeded, the variation in field curvature toward the under side is large near the telephoto limit and when the lower limit thereof is exceeded, the variation toward the over side is large.

$$\frac{|X_{LW}|}{|X_{FW}|} < 1 \quad (a)$$

$$\frac{|X_{LT}|}{|X_{FT}|} < 10 \quad (b)$$

In a zoom lens system arranged to fulfill the condition (1), the amount of focusing movement of the rearmost lens unit toward the image side is sometimes larger on the telephoto side than on the wide angle side. In a zoom lens system where the amount of focusing movement of the rearmost lens unit toward the image side is thus larger on the telephoto side than on the wide angle side, it is preferable that the space on the image side of the rearmost lens unit (i.e. back focal length) is larger on the telephoto side than on the wide angle side. To achieve this, a focusing method is optimum in which the rearmost lens unit is moved toward the object side during zooming to the telephoto side.

In the arrangement of the present invention, by moving all or a part of the lens units arranged between the first and rearmost lens units during focusing, aberrations are more excellently corrected. That is, a zoom lens system may be arranged to comprise from the object side a first lens unit of positive refractive power and a second lens unit of negative refractive power and to comprise a rearmost lens unit of negative power at the image side end and further, a lens unit (hereinafter, referred to as "intermediate lens unit", an aperture stop may be included) including all or a part of a plurality of lens units arranged between the first and rearmost lens units. During zooming from the wide angle limit to the telephoto limit, the first lens unit is moved toward the object side so that the distance between the first and second lens units increases. During focusing, the first lens unit is moved toward the object side and the rearmost lens unit and the intermediate lens unit are moved toward the image side, and the ratio between the focusing movement amounts of the first and rearmost lens units and the ratio between the focusing movement amounts of the first and intermediate lens units are varied according to zooming. Thus, by moving the intermediate lens unit toward the image side, the variation particularly in field curvature and coma due to focusing near the telephoto limit is further improved.

Further, the above-mentioned condition (1) and the following condition (2) are preferably fulfilled during focusing. The case where the condition (1) is not fulfilled is as described above. When the condition (2) is not fulfilled, the variation in field curvature and coma cannot sufficiently be restrained near the wide angle limit or near the telephoto limit.

$$\frac{|X_{MW}|}{|X_{FW}|} < \frac{|X_{MT}|}{|X_{FT}|} \quad (2)$$

where $X_{MW}$ is the amount of a focusing movement of the intermediate lens unit up to an object distance near the wide angle limit and $X_{MT}$ is the amount of a focusing movement of the intermediate lens unit up to an object distance near the telephoto limit.

Further, the above-mentioned condition (a) and the following conditions (c) to (e) are preferably fulfilled. When the upper limit of the condition (c) is exceeded, the variation in field curvature toward the under side is particularly large near the telephoto limit. When the lower limit thereof is exceeded, the variation toward the over side is large. When the condition (d) is not fulfilled, the variation in field curvature and coma is particularly large near the wide angle limit. When the upper or lower limit of the condition (e) is exceeded, the variation in field curvature and coma is large near the telephoto limit.

$$\frac{|X_{LT}|}{|X_{FT}|} < 20 \quad (c)$$

$$\frac{|X_{MW}|}{|X_{FW}|} < 0.1 \quad (d)$$

$$\frac{|X_{MT}|}{|X_{FT}|} < 10 \quad (e)$$

In a zoom lens system according to the present invention and in a zoom lens system including the above-described intermediate lens unit, the following conditions (f) and (g) are preferably fulfilled:

$$0.2 < \frac{f_{1,L-1}}{|f_L|} < 2.0 \quad (f)$$

$$1.2 < \frac{f_W}{|f_L|} < 3.0 \quad (g)$$

where $f_{1,L-1}$ is a composite focal length of the first to (L−1)th lens units at the wide angle limit (here, the rearmost lens unit is represented as an Lth lens unit from the object side), $f_L$ is a focal length of the rearmost lens unit, and $f_W$ is a focal length of the entire lens system at the wide angle limit.

The condition (f) defines the telephoto type at the wide angle limit. When the upper limit of the condition (f) is exceeded, the telephoto type is extreme, so that positive field curvature cannot be corrected. When the lower limit of the condition (f) is exceeded, the reduction in size cannot be realized. The condition (g) defines the total length of the lens system at the wide angle limit. When the upper limit of the condition (g) is exceeded, the back focal length is too short, and particularly, the balance of correction of field curvature cannot be maintained in a good condition. When the lower limit of the condition (g) is exceeded, the back focal length is too long, so that requirements of the size reduction cannot be fulfilled.

In a zoom lens system arranged to fulfill the conditions (1) and (2), the amount of movement of the rearmost and intermediate lens units toward the image side is sometimes larger on the telephoto side than on the wide angle side. In a zoom lens system where the amount of movement of the rearmost and intermediate lens units toward the image side is thus larger on the telephoto side than on the wide angle side, it is preferable that the space on the image side of the rearmost lens unit (i.e. back focal length) is larger on the telephoto side than on the wide angle side. To achieve this, a focusing method is optimum in which the rearmost lens unit is moved toward the object side during zooming to the telephoto side.

Numerical data of first to fifth embodiments of the present invention are shown in Tables 3 and 4. In the tables, ri (i=1,2,3, ... ) is a radius of curvature of an ith surface counted from the object side, di (i=1,2,3, ... ) is an lth axial distance counted from the object side, and Ni (i=1,2,3, ... ) and vi (i=1,2,3, ... ) are a refractive power and an Abbe number of an ith lens counted from the object side to d-line, respectively. A focal length f of the entire lens system and an F number FNO for a subject at infinity at the wide angle limit <W>, at the middle focal length condition <M> and at the telephoto limit <T> are also shown. For each embodiment, values corresponding to the conditions (f) and (g) are also shown.

The first and second embodiments have the same lens arrangement and zooming arrangement as those of the previously-described conventional lens system although the focusing method is different. Specifically, as shown in FIG. 1, the first and second embodiments and the conventional lens system are four-unit zoom lens systems each comprising from the object side a first lens unit Gr1 of positive refractive power including a negative meniscus lens element concave to the image side, a positive bi-convex lens element and a positive meniscus lens element convex to the object side, a second lens unit Gr2 of negative refractive power including a negative bi-concave lens element and a positive meniscus lens element convex to the object side, a third lens unit Gr3 including a negative bi-concave lens element, a positive meniscus lens element convex to the image side and two negative bi-concave lens elements, and a fourth lens unit Gr4 including a negative meniscus lens element concave to the image side, a positive meniscus lens element convex to the image side and a negative bi-concave lens element. The fourth lens unit Gr4 corresponds to the rearmost lens unit.

In the first and second embodiments, as shown in FIGS. 5A to 5C and 7A to 7C, respectively, during zooming from the wide angle limit <W> to the telephoto limit <T>, the first lens unit Gr1 and the fourth lens unit Gr4 are moved toward the object side so that the distance between the first and second lens units Gr1 and Gr2 increases, that the distance between the second and third lens units Gr2 and Gr3 decreases and that the distance between the third and fourth lens units Gr3 and Gr4 decreases.

Figure 9:
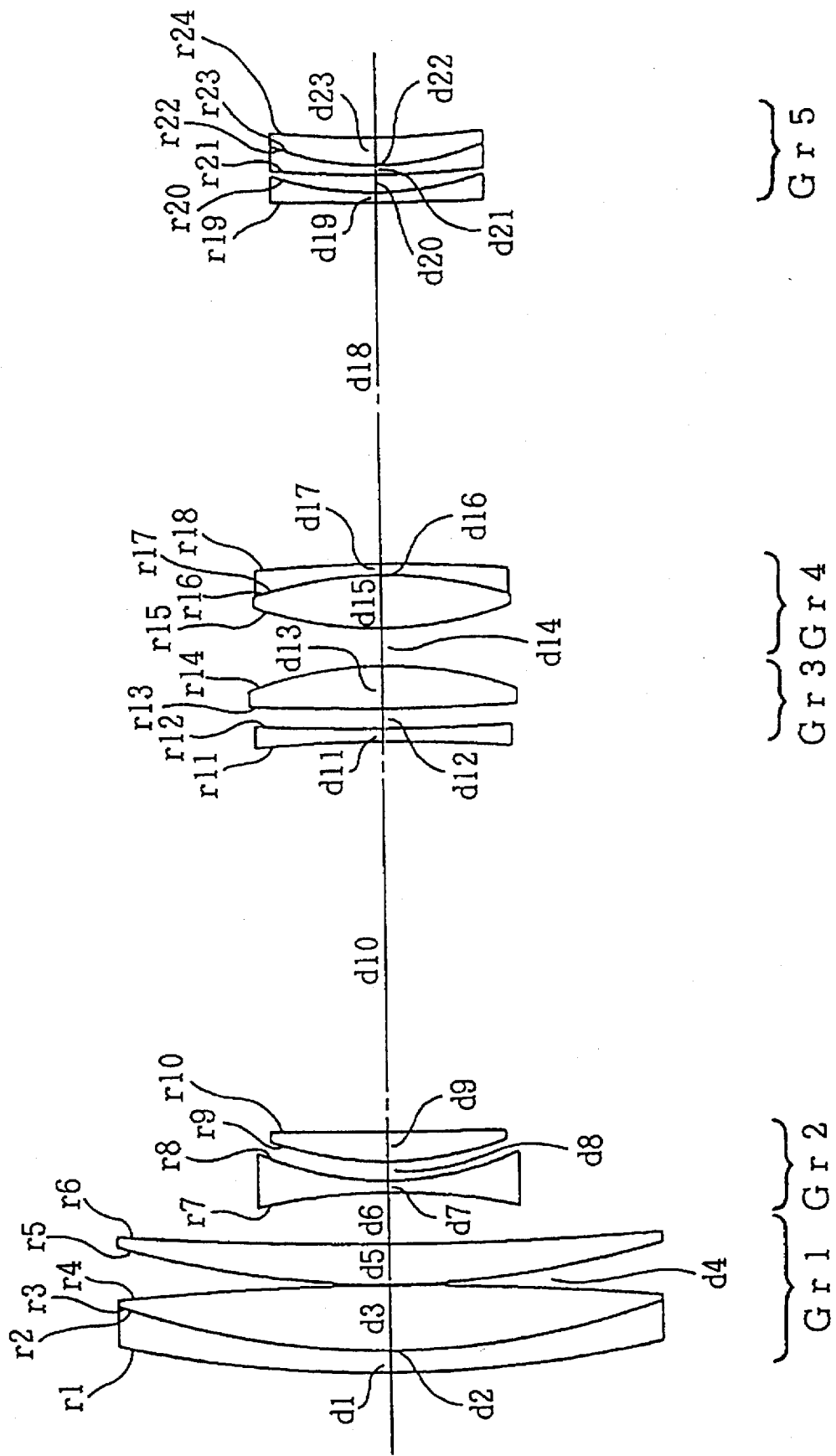
FIG. 9 shows the lens arrangement of third to fifth embodiments of the present invention.

The third to fifth embodiments are, as shown in FIG. 9, five-unit zoom lens systems each comprising from the object side a first lens unit GR1 of positive refractive power including a negative meniscus lens element concave to the image side, a positive bi-convex lens element and a positive meniscus lens element convex to the object side, a second lens unit Gr2 of negative refractive power including a negative bi-concave lens element and a positive meniscus lens element convex to the object side, a third lens unit Gr3 of positive refractive power including a negative bi-concave lens element and a positive bi-convex lens element, a fourth lens unit Gr4 of positive refractive power including a positive bi-convex lens element and a negative meniscus lens element concave to the object side, and a fifth lens unit Gr5 of negative refractive power including two negative meniscus lenses elements concave to the image side and a positive meniscus lens element convex to the object side. The fifth lens unit Gr5 corresponds to the rearmost lens unit.

In the third to fifth embodiments, as shown in FIGS. 11A to 11C, 13A to 13C and 15A to 15C, during zooming from the wide angle limit <W> to the telephoto limit <T>, the first lens unit Gr1 and the fifth lens unit Gr5 are moved toward the object side so that the distance between the first lens unit Gr1 and the second lens unit Gr2 increases, that the distance between the second lens unit Gr2 and the third lens unit Gr3 decreases and that the distance between the fourth lens unit Gr4 and the fifth lens unit Gr5 decreases.

A focusing method employed by the first to fifth embodiments will be described. With respect to the focusing movement amount, the movement toward the object side is represented by a positive value. The ratios of movement amounts of the lens units moved during focusing are also shown in FIGS. 5A to 5C, 7A to 7C, 11A to 11C, 13A to 13C and 15A to 15C.

In the first embodiment, during focusing, the first lens unit Gr1 is moved toward the object side and the fourth lens unit Gr4 is moved toward the image side at a ratio between the focusing movement amounts shown in Table 5. In the second embodiment, during focusing, the first lens unit Gr1 and the fourth lens unit Gr4 are moved toward the object side and toward the image side, respectively, and an intermediate lens unit $M_{2,3}$ including the second and third lens units Gr2 and Gr3 is temporarily moved toward the image side at a ratio between the focusing movement amounts shown in Table 6. Here, $X_{2,3}$ is a focusing movement amount of the intermediate lens unit $M_{2,3}$ including the second and third lens units Gr2 and Gr3. During focusing, the aperture stop is also moved integrally with the second and third lens units Gr2 and Gr3.

In the third embodiment, during focusing, the first lens unit Gr1 is moved toward the object side and the fifth lens unit Gr5 is moved toward the image side at a ratio between the focusing movement amounts shown in Table 7. In the fourth embodiment, during focusing, the first lens unit Gr1 and the fifth lens unit Gr5 are moved toward the object side and toward the image side, respectively, and an intermediate lens unit $M_{2-4}$ including the second to fourth lens units Gr2 to Gr4 is temporarily moved toward the image side at a ratio between the focus movement amounts shown in Table 8. In the fifth embodiment, during focusing, the first lens unit Gr1 and the fifth lens unit Gr5 are moved toward the object side and toward the image side, respectively, and an intermediate lens unit $M_{2,3}$ including the second and third lens units Gr2 and Gr3 is temporarily moved toward the image side at a ratio between the focusing movement amounts shown in Table 9. Here, $X_5$ is a focusing movement amount of the fifth lens unit and $X_{2-4}$ is an integral focusing movement amount of the intermediate lens unit $M_{2-4}$ including the second to fourth lens units Gr2 to Gr4. During focusing, the aperture stop is also moved integrally with the second to fourth lens units Gr2 to Gr4 or the second and third lens units Gr2 and Gr3.

Figure 10A:
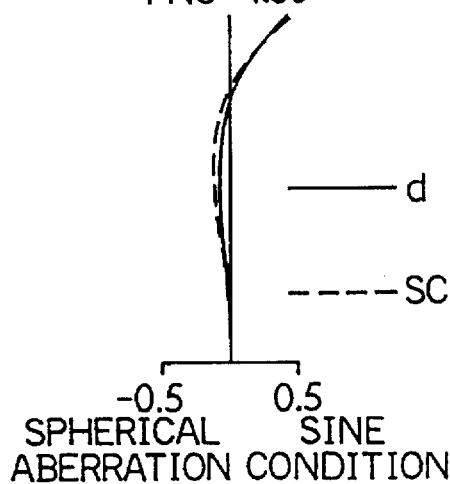
FIGS. 10A to 10I show aberration curves of the third to fifth embodiments for a subject at infinity.
Figure 10B:
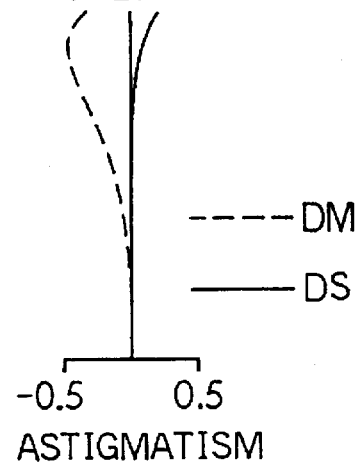
Figure 10C:
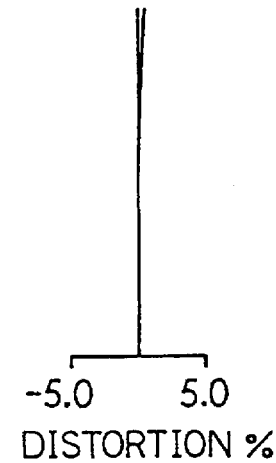
Figure 10D:
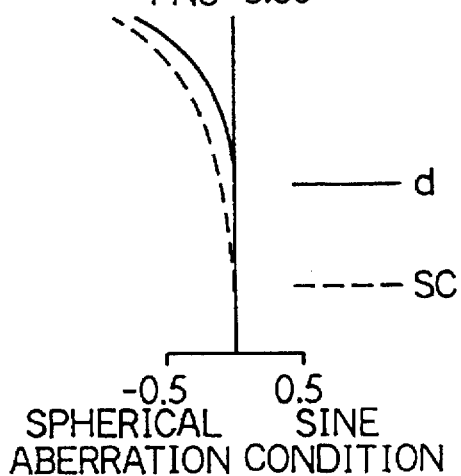
Figure 10E:
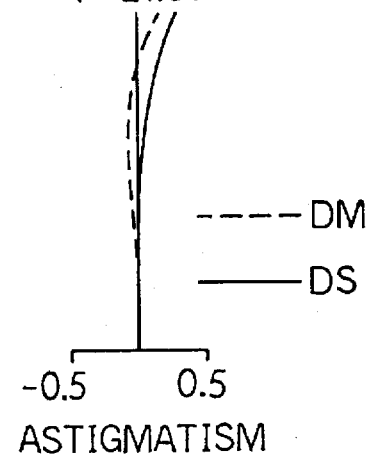
Figure 10F:
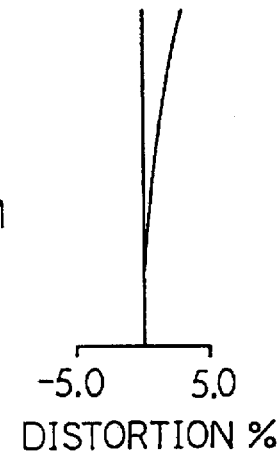
Figure 10G:
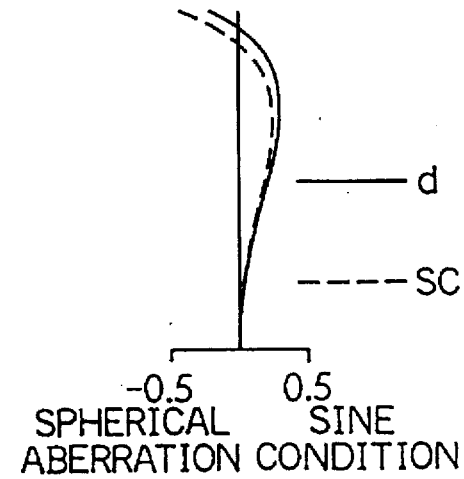
Figure 10H:
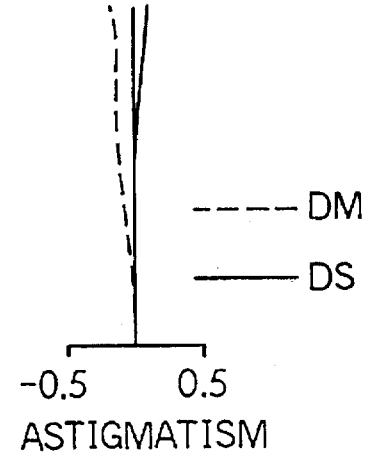
Figure 10I:
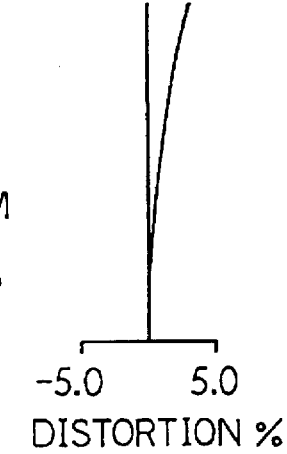
Figure 11A:
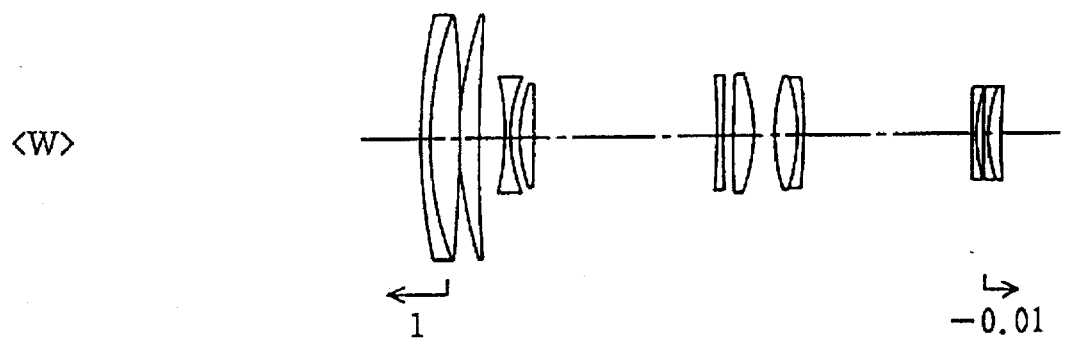
FIGS. 11A to 11C show the movements of the lens units of the third embodiment.
Figure 11B:
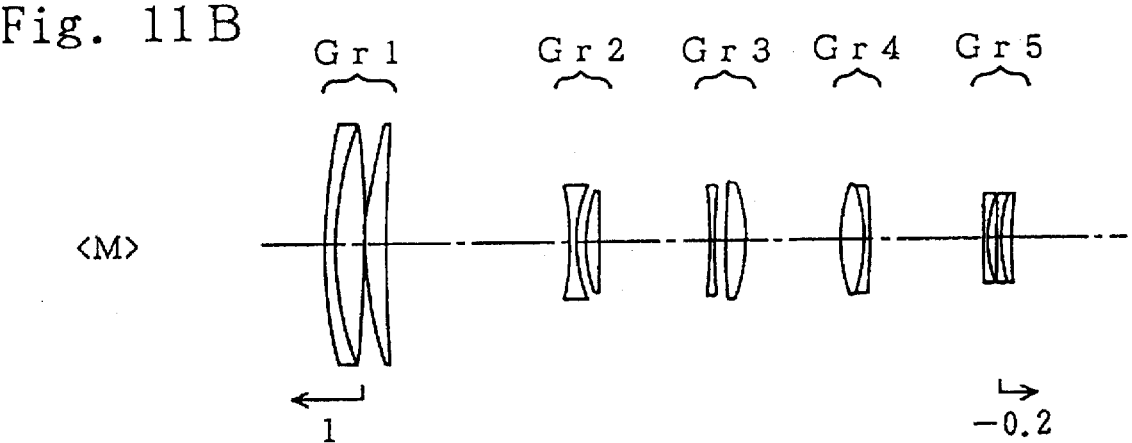
Figure 11C:
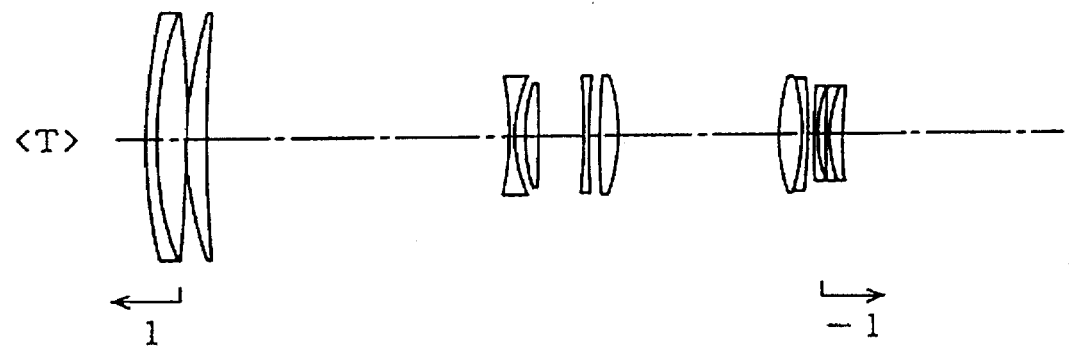
Figure 13A:
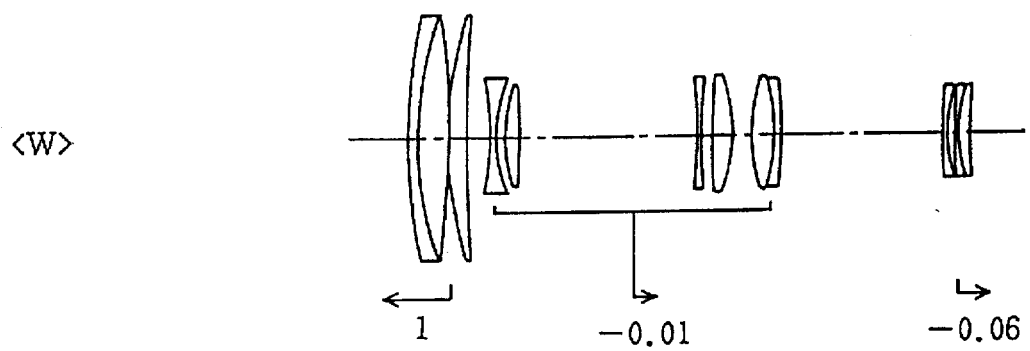
FIGS. 13A to 13C show the movements of the lens units of the fourth embodiment.
Figure 13B:
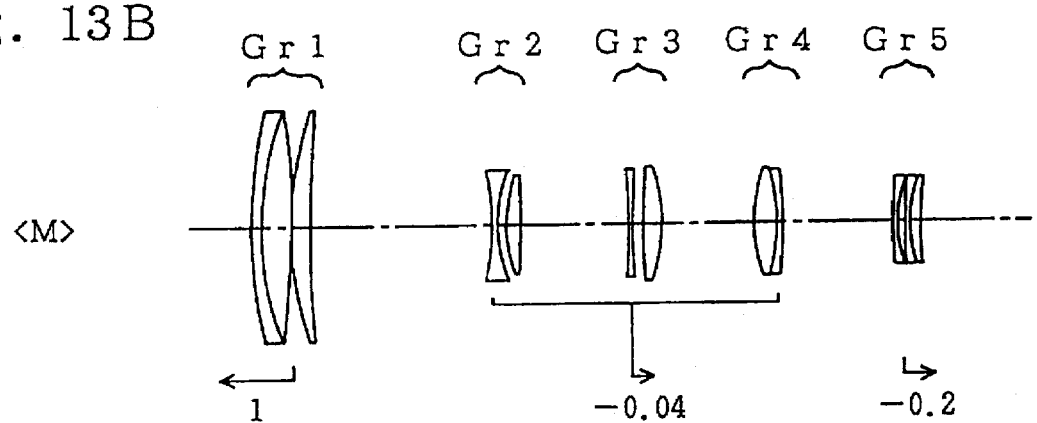
Figure 13C:
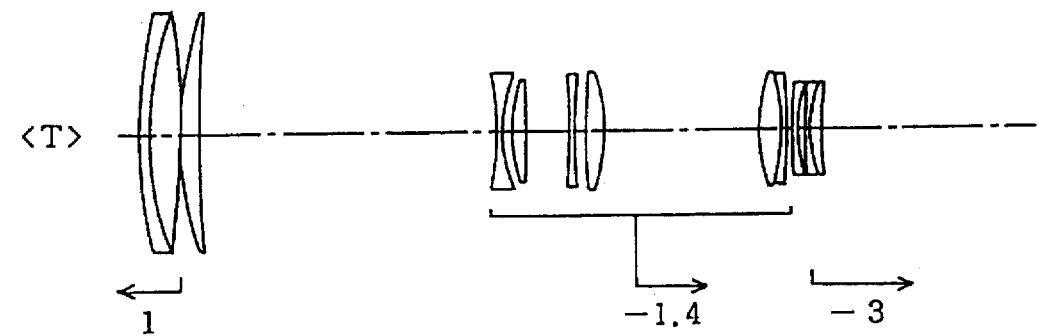
Figure 15A:
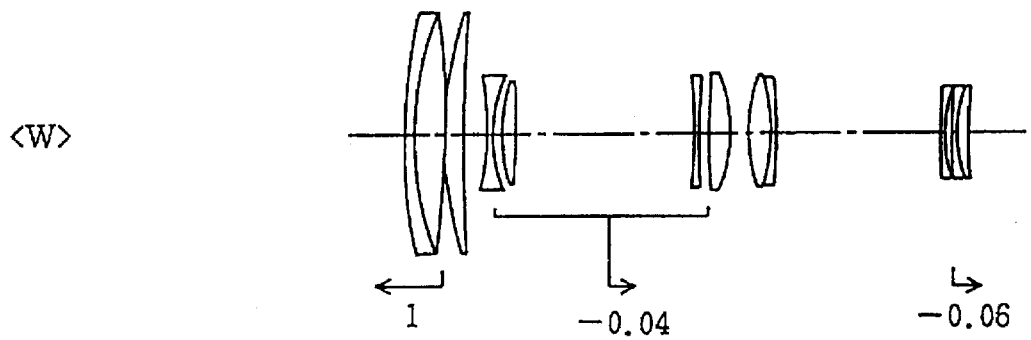
FIGS. 15A to 15C show the movements of the lens units of the fifth embodiment.
Figure 15B:
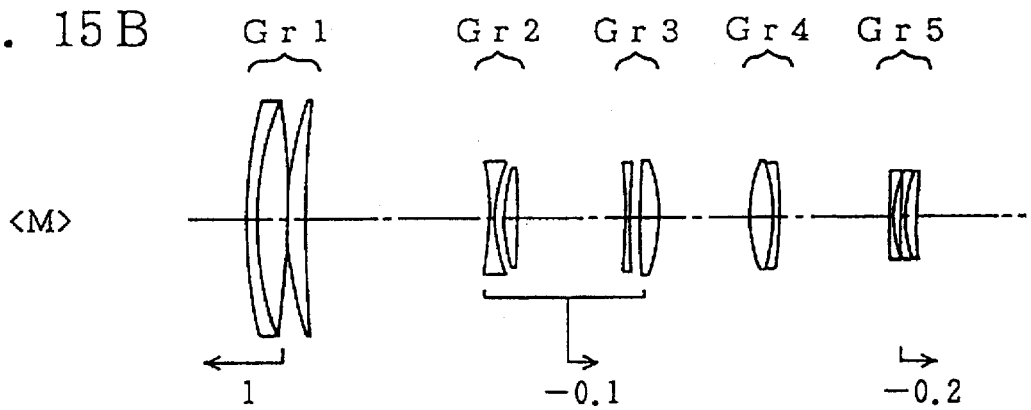
Figure 15C:
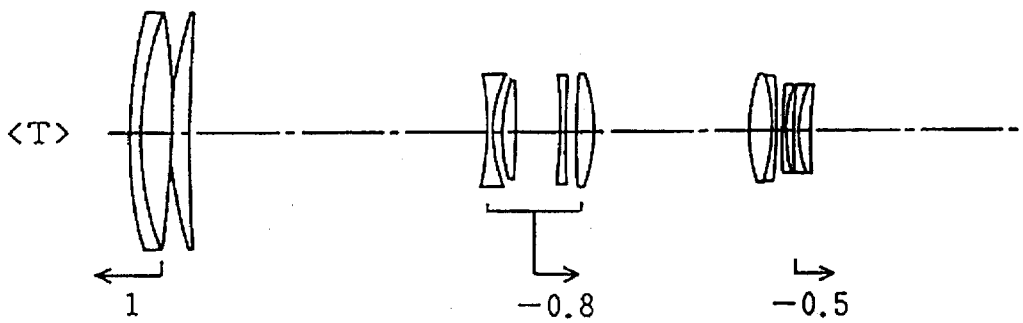
Figure 16A:
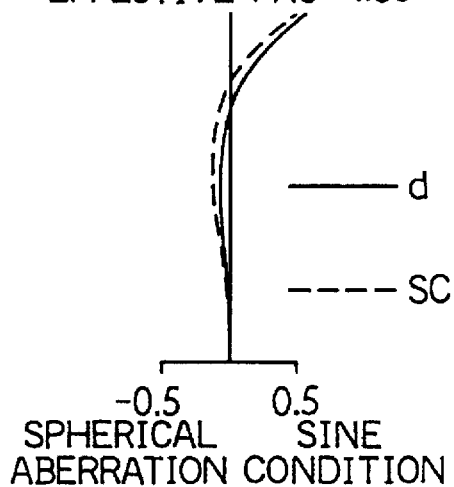
FIGS. 16A to 16I show aberration curves of the fifth embodiment for a subject at the shortest object distance.
Figure 16B:
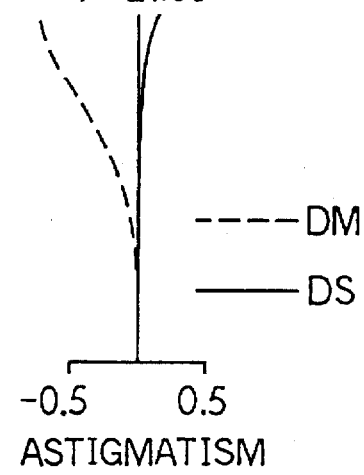
Figure 16C:
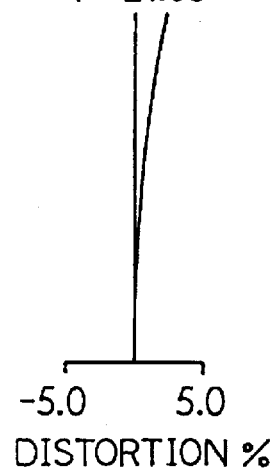
Figure 16D:
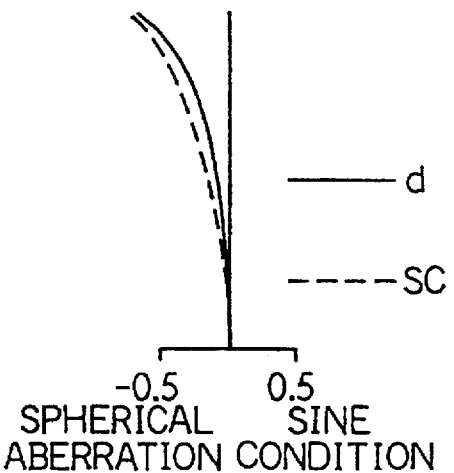
Figure 16E:
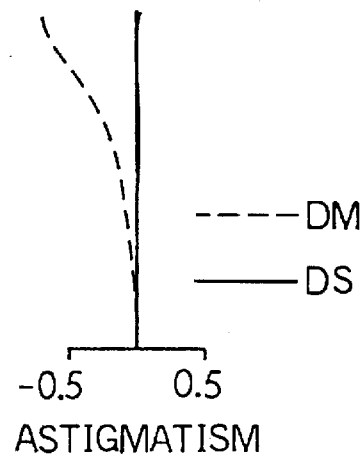
Figure 16F:
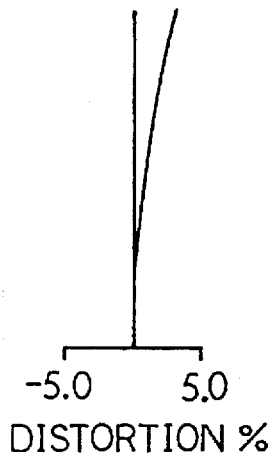
Figure 16G:
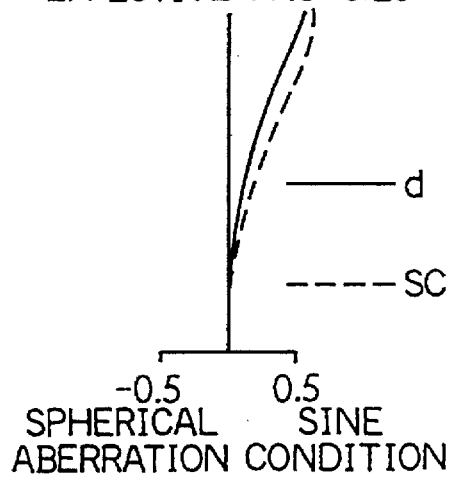
Figure 16H:
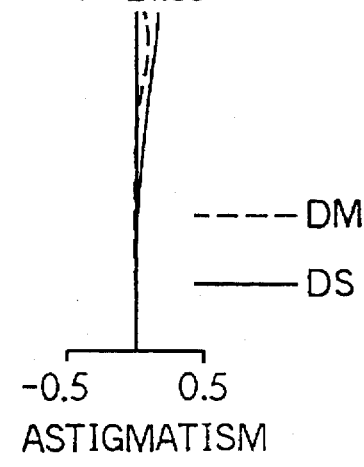
Figure 16I:
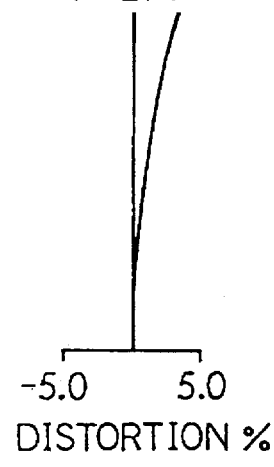

FIGS. 10A to 10I show aberration curves of the third to fifth embodiments for a subject at infinity. FIGS. 10A to 10C show aberration curves at the wide angle limit. FIGS. 10D to 10F show aberration curves at the middle focal length condition. FIGS. 10G to 10I show aberration curves at the telephoto limit. FIGS. 6A to 6I, 8A to 8I, 12A to 12I, 14A to 14I and 16A to 16I show aberrations curves of the first to fifth embodiments for a subject at the shortest object distance. FIGS. 6A to 6C, 8A to 8C, 12A to 12C, 14A to 14C and 16A to 16C show aberration curves at the wide angle limit. FIGS. 6D to 6F, 8D to 8F, 12D to 12F, 14D to 14F and 16D to 16F show aberration curves at the middle focal length condition. FIGS. 6G to 6I, 8G to 8I, 12G to 12I, 14G to 14I and 16G to 16I show aberration curves at the telephoto limit. In these figures, the solid line d represents an aberration to d-line. The broken line SC represents a sine condition. The broken line DM and the solid line DS represent astigmatism on the meridional and sagittal image planes, respectively.

As described above, according to the present invention, during focusing, the first lens unit is moved toward the object side and the rearmost lens unit is moved toward the image side, and the ratio between the focusing movement amounts of the first and rearmost lens units are varied according to zooming, so that the variation in aberrations due to focusing is restrained. As a result, the maximum magnification is increased.

Obviously, many modifications and variations of the present invention are possible in light of the above teachings. It is therefore to be understood that within the scope of the appended claims, the invention may be practiced other than as specifically described.

TABLE 1

|  | Wide angle limit | | Telephoto limit | |
|---|---|---|---|---|
| Focusing method | Spherical aberration | Field curvature | Spherical aberration | Field curvature |
| F method | Not vary so much | Over | Over | Over |
| L method | Not vary so much | Under | Under | Under |

TABLE 2

|  | Shortest object distance (m) | Focusing movement amount ratio $[X_4/X_1]$ |
|---|---|---|
| Wide angle limit <W> | 1.0 | −1.0 |
| Middle focal length condition <M> | 1.0 | −1.0 |
| Telephoto limit <T> | 1.0 | −1.0 |

TABLE 3

(1st and 2nd Embodiments, Prior Art)

f = 102.5 to 200.0 to 390.0      FNO = 4.60 to 5.80 to 6.90

| Radius of Curvature | | Axial Distance | | Refractive Index | | Abbe Number |
|---|---|---|---|---|---|---|
| r1 | 124.624 | d1 | 2.607 | N1 | 1.85000 v1 | 40.04 |
| r2 | 81.092 | d2 | 0.100 | | | |
| r3 | 81.092 | d3 | 8.000 | N2 | 1.49310 v2 | 83.58 |
| r4 | −2306.804 | d4 | 0.200 | | | |
| r5 | 130.980 | d5 | 4.736 | N3 | 1.48749 v3 | 70.44 |
| r6 | 1509.547 | d6 | 4.000 to 45.894 to 95.368 | | | |
| r7 | −236.683 | d7 | 1.464 | N4 | 1.7440 v4 | 44.93 |
| r8 | 38.455 | d8 | 4.526 | | | |
| r9 | 44.889 | d9 | 3.014 | N5 | 1.75520 v5 | 27.51 |
| r10 | 328.184 | d10 | 63.300 to 35.005 to 3.801 | | | |
| r11 | −38.836 | d11 | 1.594 | N6 | 1.84666 v6 | 23.83 |
| r12 | 178.337 | d12 | 2.700 | | | |
| r13 | −364.086 | d13 | 3.503 | N7 | 1.59270 v7 | 35.45 |
| r14 | −38.572 | d14 | 1.461 | | | |
| r15 | 238.824 | d15 | 4.512 | N8 | 1.51823 v8 | 58.96 |
| r16 | −42.631 | d16 | 0.100 | | | |
| r17 | 48.402 | d17 | 4.620 | N9 | 1.48749 v9 | 70.44 |
| r18 | −1238.911 | d18 | 32.868 to 19.269 to 0.999 | | | |
| r19 | 64.228 | d19 | 1.200 | N10 | 1.75450 v10 | 51.57 |
| r20 | 33.864 | d20 | 3.974 | | | |
| r21 | −115.912 | d21 | 3.225 | N11 | 1.67339 v11 | 29.25 |
| r22 | −30.120 | d22 | 0.010 | N12 | 1.51400 v12 | 42.83 |
| r23 | −30.120 | d23 | 1.224 | N13 | 1.69680 v13 | 56.47 |
| r24 | 422.978 | Σd = 152.936 to 152.936 to 152.936 | | | | |

[Conditions (f) and (g)]
$f_{1L-1}/f_L = -1.002$
$f_W/f_L = -1.493$

TABLE 4

(3rd to 5th Embodiments,)

f = 103.0 to 200.0 to 388.0    FNO = 4.60 to 5.60 to 6.70

| | Radius of Curvature | | Axial Distance | | Refractive Index | | Abbe Number |
|---|---|---|---|---|---|---|---|
| r1 | 147.745 | d1 | 2.748 | N1 | 1.80518 | v1 | 25.43 |
| r2 | 94.235 | d2 | 0.010 | N2 | 1.51400 | v2 | 42.83 |
| r3 | 94.235 | d3 | 7.999 | N3 | 1.48749 | v3 | 70.15 |
| r4 | −357.606 | d4 | 0.200 | | | | |
| r5 | 110.773 | d5 | 4.984 | N4 | 1.48749 | v4 | 70.15 |
| r6 | 440.921 | d6 | 6.377 to 48.377 to 78.672 | | | | |
| r7 | −75.178 | d7 | 1.422 | N5 | 1.80500 | v5 | 40.97 |
| r8 | 36.179 | d8 | 2.415 | | | | |
| r9 | 41.029 | d9 | 3.591 | N6 | 1.78472 | v6 | 25.70 |
| r10 | 696.903 | d10 | 47.254 to 28.632 to 11.930 | | | | |
| r11 | −176.058 | d11 | 1.592 | N7 | 1.84666 | v7 | 23.89 |
| r12 | 267.376 | d12 | 2.570 | | | | |
| r13 | 306.189 | d13 | 5.287 | N8 | 1.61772 | v8 | 49.82 |
| r14 | −44.918 | d14 | 4.652 to 23.273 to 39.975 | | | | |
| r15 | 44.941 | d15 | 6.451 | N9 | 1.51680 | v9 | 64.20 |
| r16 | −47.380 | d16 | 0.010 | N10 | 1.51400 | v10 | 42.83 |
| r17 | −47.380 | d17 | 1.368 | N11 | 1.83400 | v11 | 37.17 |
| r18 | −178.468 | d18 | 43.462 to 29.116 to 1.567 | | | | |
| r19 | 642.450 | d19 | 1.170 | N12 | 1.78100 | v12 | 44.55 |
| r20 | 40.221 | d20 | 2.010 | | | | |
| r21 | 127.407 | d21 | 1.103 | N13 | 1.77250 | v13 | 49.77 |
| r22 | 35.214 | d22 | 0.010 | N14 | 1.51400 | v14 | 42.83 |
| r23 | 35.214 | d23 | 3.203 | N15 | 1.75000 | v15 | 25.14 |
| r24 | 111.590 | Σd = 149.890 to 177.544 to 180.290 | | | | | |

[Conditions (f) and (g)]
$f_{1,L-1}/f_L = -1.096$
$f_W/f_L = -2.033$

TABLE 5

| | Maximum magnification | Focusing movement amount ratio $[X_4/X_1]$ |
|---|---|---|
| Wide angle limit <W> | ¼ | −0.1 |
| Middle focal length condition <M> | ⅓ | −0.4 |
| Telephoto limit <T> | ½ | −3.0 |

TABLE 6

| | Maximum magnification | Focusing movement amount ratio | |
|---|---|---|---|
| | | $X_4/X_1$ | $X_{2,3}/X_1$ |
| Wide angle limit <W> | ¼ | −0.1 | −0.01 |
| Middle focal length condition <M> | ⅓ | −0.4 | −0.15 |
| Telephoto limit <T> | ½ | −10.0 | −6.0 |

TABLE 7

| | Maximum magnification | Focusing movement amount ratio $[X_5/X_1]$ |
|---|---|---|
| Wide angle limit <W> | ¼ | −0.01 |
| Middle focal length condition <M> | ⅓ | −0.2 |
| Telephoto limit <T> | ½ | −1.0 |

TABLE 8

| | Maximum magnification | Focusing movement amount ratio | |
|---|---|---|---|
| | | $X_5/X_1$ | $X_{2-4}/X_1$ |
| Wide angle limit <W> | ¼ | −0.06 | −0.01 |
| Middle focal length condition <M> | ⅓ | −0.2 | −0.04 |
| Telephoto limit <T> | ½ | −3.0 | −1.4 |

TABLE 9

| | Maximum magnification | Focusing movement amount ratio | |
|---|---|---|---|
| | | $X_5/X_1$ | $X_{2,3}/X_1$ |
| Wide angle limit <W> | ¼ | −0.06 | −0.04 |
| Middle focal length condition <M> | ⅓ | −0.2 | −0.1 |
| Telephoto limit <T> | ½ | −0.5 | −0.8 |

What is claimed is:

1. A zoom lens system comprising from an object side a first lens unit of positive refractive power and a second lens unit of negative refractive power, said zoom lens system further comprising a rearmost lens unit of negative refractive power on a most image side, wherein during zooming from a shortest focal length condition to a longest focal length condition, the first lens unit is moved toward the object side so that a distance between the first and second lens units increases, and wherein during focusing to a shorter object distance condition, the first lens unit is moved toward the object side while the rearmost lens unit is moved toward an image side, and a ratio between movement amounts of the first and rearmost lens units for focusing varies according to zooming.

2. A zoom lens system as claimed in claim 1, wherein the following condition is fulfilled:

$$\frac{|X_{LW}|}{|X_{FW}|} < \frac{|X_{LT}|}{|X_{FT}|}$$

where $X_{FW}$ represents an amount of movement of the first lens unit for focusing to an object distance in a vicinity of the shortest focal length condition, $X_{LW}$ represents an amount of movement of the rearmost lens unit for focusing to an object distance in a vicinity of the shortest focal length condition, $X_{FT}$ represents an amount of movement of the first lens unit for focusing to an object distance in a vicinity of the longest focal length condition, and $X_{LT}$ represents an amount of movement of the rearmost lens unit for focusing to an object distance in a vicinity of the longest focal length condition.

3. A zoom lens system as claimed in claim 2, wherein the following condition is fulfilled:

$$\frac{|X_{LW}|}{|X_{FW}|} < 1.$$

4. A zoom lens system as claimed in claim 2, wherein the following condition is fulfilled:

$$\frac{|X_{LT}|}{|X_{FT}|} < 10.$$

5. A zoom lens system as claimed in claim 1, wherein the following condition is fulfilled:

$$0.2 < \frac{f_{1,L-1}}{|f_L|} < 2.0$$

where $f_{1,L-1}$ is a composite focal length of the first to (L−1)th lens units at the shortest focal length condition (here, the rearmost lens unit is represented as an Lth lens unit from the object side), and $f_L$ is a focal length of the rearmost lens unit.

6. A zoom lens system as claimed in-claim 1, wherein the following condition is fulfilled:

$$1.2 < \frac{f_W}{|f_L|} < 3.0$$

where $f_L$ is a focal length of the rearmost lens unit, and $f_W$ is a focal length of an entire lens system at the shortest focal length condition.

7. A zoom lens system as claimed in claim 1, wherein during zooming from the shortest focal length condition to the longest focal length condition, the rearmost lens unit is moved toward the object side.

8. A zoom lens system comprising from an object side:

a first lens unit of positive refractive power;

a second lens trait of negative refractive power; and a rearmost lens unit of negative refractive power on a most image side, wherein during zooming from a shortest focal length condition to a longest focal length condition, the first lens unit and the second lens unit move relative to each other; and wherein during focusing to a shorter object distance condition, the first lens unit is moved toward the object side while the rearmost lens unit is moved toward an image side, and a ratio between movement amounts of the first and rearmost lens units for focusing varies according to zooming, wherein the following condition is fulfilled:

$$\frac{|X_{LW}|}{|X_{FW}|} < \frac{|X_{LT}|}{|X_{FT}|}$$

where $X_{FW}$ represents an amount of movement of the first lens unit for focusing to an object distance in a vicinity of the shortest focal length condition, $X_{LW}$ represents an amount of movement of the rearmost lens unit for focusing to an object distance in a vicinity of the shortest focal length condition, $X_{LT}$ represents an amount of movement of the first lens unit for focusing to an object distance in a vicinity of the longest focal length condition, and $X_{LT}$ represents an amount of movement of the rearmost lens unit for focusing to an object distance in a vicinity of the longest focal length condition.

9. A zoom lens system as claimed in claim wherein the following condition is fulfilled:

$$\frac{|X_{LW}|}{|X_{FW}|} < 1.$$

10. A zoom lens system as claimed in claim 9, wherein the following condition is fulfilled:

$$\frac{|X_{LT}|}{|X_{FT}|} < 10.$$

11. A zoom lens system comprising from an object side:

a first lens unit of positive refractive power;

a second lens unit of negative refractive power; and a rearmost lens unit of negative refractive power on a most image side, wherein during zooming from a shortest focal length condition to a longest focal length condition, the first lens unit is moved toward the object side so that a distance between the first and second lens units increases, and wherein during focusing to a shorter object distance condition, the first lens unit and the rearmost lens unit are moved, and a ratio between movement amounts of the first and rearmost lens units for focusing varies according to zooming, wherein the following condition is fulfilled:

$$\frac{|X_{LW}|}{|X_{FW}|} < \frac{|X_{LT}|}{|X_{FT}|}$$

where $X_{FW}$ represents an amount of movement of the first lens unit for focusing to an object distance in a vicinity of the shortest focal length condition, $X_{LW}$ represents an amount of movement of the rearmost lens unit for focusing to an object distance in a vicinity of the shortest focal length condition, $X_{FT}$ represents an amount of movement of the first lens unit for focusing to an object distance in a vicinity of the longest focal length condition, and $X_{LT}$ represents an amount of movement of the rearmost lens unit for focusing to an object distance in a vicinity of the longest focal length condition.

12. A zoom lens system as claimed in claim 11, wherein the following condition is fulfilled:

$$\frac{|X_{LW}|}{|X_{FW}|} < 1.$$

13. A zoom lens system as claimed in claim 11, wherein the following condition is fulfilled:

$$\frac{|X_{LT}|}{|X_{FT}|} < 10.$$

\* \* \* \* \*